United States Patent [19]
Baek et al.

[11] Patent Number: 5,886,884
[45] Date of Patent: Mar. 23, 1999

[54] PASSIVE RIPPLE FILTER FOR ZERO VOLTAGE-ZERO CURRENT SWITCHED FULL-BRIDGE DC/DC CONVERTERS

[75] Inventors: Ju-Won Baek; Jung-Goo Cho, both of Kyongnam; Geun-Hie Rim, Seoul; Eun-Soo Kim, Kyongnam, all of Rep. of Korea

[73] Assignee: Korea Electrotechnology Research Institute, Kyongnam, Rep. of Korea

[21] Appl. No.: 958,368

[22] Filed: Oct. 27, 1997

[30] Foreign Application Priority Data

Oct. 29, 1996 [KR] Rep. of Korea ................... 1996-51629

[51] Int. Cl.$^6$ ...................................................... H02M 1/14
[52] U.S. Cl. ................................................. 363/48; 363/17
[58] Field of Search .................................... 363/17, 45, 47, 363/48

[56] References Cited

U.S. PATENT DOCUMENTS

| | | | |
|---|---|---|---|
| 3,745,443 | 7/1973 | Weil | 363/47 |
| 4,833,585 | 5/1989 | Moran | 363/45 |
| 4,977,493 | 12/1990 | Smith | 363/48 |
| 5,774,346 | 6/1998 | Poon et al. | 363/17 |

OTHER PUBLICATIONS

Cho et al., IEEE, Jul. 1996, "Zero Voltage and Zero Current Switching Full Bridge PWM Converter Using Secondary Active Clamp".

Cho et al., IEEE, May 1997, "Novel Zero–voltage and Zero–Current–Switching (ZVZCS) Full Bridge PWM Converter Using Transformer Auxiliary Winding".

IEEE, Oct. 1978, "Switching DC–To–DC Converter with Zero Input or Output Current Ripple".

Kim et al., IEEE, Jul. 1996, "An Improved Soft Switching PWM FB DC/DC Converter for Reducing Condution Losses".

*Primary Examiner*—Jeffrey Sterrett
*Attorney, Agent, or Firm*—Nikaido, Marmelstein, Murray & Oram LLP

[57] ABSTRACT

The present invention is a circuit for zero voltage-zero current switching in a full-bridge DC-DC converter including a transformer for inducing the current and the voltage onto the secondary side by the switching operation of switches configured as full bridge; a full-bridge rectifier by which current of the secondary side flows in only one direction; a smoothing inductor and a capacitor as an output filter, the present circuit comprised of a capacitor and a discharge diode connected in series between the output of the full-bridge rectifier and a ground; a secondary winding of the smoothing inductor and a charge diode connected in series across the capacitor; and another capacitor connected in series with the charge diode. The present circuit configured in the above arrangement enables a full-bridge DC—DC converter to perform a switching operation at zero voltage and zero current without active elements or dissipative elements such as a saturation reactor, thereby achieving a reduction in cost in the manufacture of a converter. In addition, the present circuit reduces the ripples in the output current flowing through the inductor, and is consequently well suited for a DC—DC converter requiring high-frequency switching.

6 Claims, 12 Drawing Sheets

PASSIVE RIPPLE FILTER FOR ZERO VOLTAGE-ZERO CURRENT SWITCHED FULL-BRIDGE DC/DC CONVERTERS

BACKGROUND OF THE INVENTION

1. Field of the Invention

The present invention relates to a circuit for zero voltage-zero current switching in a full-bridge DC-DC converter, and more particularly to a circuit for zero voltage-zero current switching that can achieve a significant reduction in ripples of an output current as well as zero voltage-zero current switching with only passive minority-carrier elements on the secondary side in a full-bridge DC-DC converter.

2. Brief Description of the Prior Art

Because both voltage and current switching transitions have time lapse during the switching operation of power semiconductor elements, when a switch turns ON or OFF, there is a time interval where both current and voltage are applied to the switch simultaneously, resulting in a power loss during the time interval. In particular, a switching device such as an IGBT (Insulated Gate Bipolar Transistor) or a GTO(Gate Turn Off thyristor) has a large turn-off switching loss because a tail current flows through the switching device during time interval (shown by 'L' of FIG. 7) after voltage has been applied across the switch, as shown in FIG. 7.

The maximum switching frequency is usually limited because such a switching loss increases in proportion to the frequency. Accordingly, in order to reduce the switching loss and to achieve high-frequency switching operation of such a switching device with the above-mentioned characteristics, either a zero current switching scheme (FIG. 8A) or a zero voltage switching scheme (FIG. 8B) is usually used. After freewheeling current flows through a diode connected in reverse-parallel with a switching device and then the voltage applied across it becomes zero, when the switching device is turned ON, the switching operation at zero voltage is performed, so there is no switching loss, as shown in FIG. 8A. On the other hand, a switching loss still occurs when the switching device turns OFF; this is shown in FIG. 7. Connecting a snubber capacitor across the switching device can slow down the rising slope of the voltage across the switching device, as shown in FIG. 8A, thereby reducing the turn-off switching loss.

If a switching device turns OFF when current flowing through it is zero, there is no energy loss caused by turn-off because stored minority carriers generating the tail current have disappeared. When the switching device turns ON, a switching loss still occurs due to the time duration required for reverse-recovery of the diode. However, because there is no reverse-recovery of diodes in a full-bridge DC-DC converter, there is a negligible switching loss caused by turn-on; consequently, the zero current switching is preferable to zero voltage switching in the full-bridge DC-DC converter.

Currently, a full-bridge DC-DC converter with zero voltage switching is used for high-power and high-frequency switching. In addition, a snubber capacitor with a large capacitance cannot be connected in parallel with the switching device because zero voltage switching can be used in a situation where a load range is narrow. Therefore, switching devices using a minority carrier such as IGBT or GTO have many problems resulting from a large switching loss during the high-frequency switching operation.

Full-bridge DC-DC converters capable of performing both zero-voltage switching and zero-current switching, as shown in FIG. 6, have been proposed to enable a high-frequency switching operation with those switching devices using minority carriers.

The full-bridge DC-DC converter of FIG. 6 comprised of the left leg of switch S1 and S3 on the primary side for performing zero-voltage switching and right leg of switch S2 and S4 for performing zero-current switching under the large range of the load, is capable of performing a high-frequency switching operation with switching devices, such as IGBT and GTO, where the tail current flows through when turned off, and reducing the energy loss of the transformer T and switches S1, S2, S3, and S4 on the primary side by having the freewheeling current of the second side flow through rectifiers D1, D2, D3, and D4 on the secondary side in a current freewheeling mode, rather than through the circuits on the primary side.

However, the full-bridge DC-DC converters, constructed as shown in FIG. 6, have their respective problems. A saturation reactor SR included on the primary side experiences undesirable power loss and requires additional cooling devices. In addition, the insertion of an active element in the secondary side, as shown in FIG. 6(b), demands a control circuit, resulting in additional cost.

For the converter circuit of FIG. 6(c), the voltage $V_{rec}$ of rectifiers D1, D2, D3, and D4 on the secondary side is doubled by a resonance between the leakage inductance of the transformer T and the capacitor in an auxiliary circuit 10. This causes larger voltage stresses to diodes D1, D2, D3, and D4. There are other problems as well in requiring more elements.

SUMMARY OF THE INVENTION

Accordingly, it is the general object of the present invention to solve the above-mentioned problems and to provide a novel circuit for zero voltage-zero current switching in a full-bridge DC-DC converter, requiring neither active elements nor dissipative elements such as saturation reactors, and no high-voltage stresses to rectifiers.

Another specific object of the present invention is to provide a circuit for the zero voltage-zero current switching circuit of a full-bridge DC-DC converter with the capability of reducing ripples in the output current, requiring fewer elements by using the output filter of a converter.

Still another object of the present invention is to provide a circuit for zero voltage-zero current switching in a full-bridge DC-DC converter with the capability of reducing ripples in the output current to prevent an excessive peak from breaking out when the current is charged into the capacitive element of the circuit.

Additional features and advantages of the invention will be set forth in the following description, and in part will be apparent from the description, or may be learned by practice of the invention. The objectives and other advantages of the invention will be realized and attained from the structure particularly pointed out in the written description and claims hereof, as well as from the appended drawings.

To achieve the above objectives, a circuit for zero voltage-zero current switching in a full-bridge DC-DC converter is characterized in that the circuit is comprised of a secondary winding of the smoothing inductor; a first passive capacitive element and a first rectifying element that are connected to the secondary winding to form a closed loop having three connecting points (P, Q, and R); and a second rectifying element connected between any connecting point (P) on the closed loop and an output terminal of a rectifier on the secondary side of the converter, wherein: the second rectifying element directs a current to flow toward a positive terminal of the rectifier; one of the other two connecting points (Q and R) on the closed loop is connected to the other output terminal of the rectifier; and three elements in the closed loop are arranged in such a way that a current induced to the secondary winding by the current flowing through the smoothing inductor charges the first passive capacitive element wherein its side facing the positive terminal of the rectifier becomes positive while the first rectifying element is not located in a path through which the first passive capacitive element discharges.

The present invention is further characterized in that the circuit has a second capacitor to be inserted in the full-bridge DC-DC converter such that it offers a path through which ripple currents bypass to reduce ripples in the output current to load.

The present invention is further characterized in that a circuit for zero voltage-zero current switching in a full-bridge DC-DC converter is comprised of a passive capacitive element; and first and second rectifying elements, wherein: the three elements are configured such that they form a Y-type connection with one another; the passive capacitive element is connected to a positive terminal of a rectifier on the secondary side of the converter; the first rectifying element is connected with the smoothing capacitor, directing a current charging the passive capacitive element to flow into a load; and the second rectifying element is connected to the ground to direct a discharging current from the passive capacitive element to flow through the smoothing inductor.

The present invention is further characterized in-that the circuit is comprised of an additional passive inductive element to serve as a path which the current charging the passive capacitive element flows through but no current discharging from the passive capacitive element can through.

If the circuit, as described above, with the capability of reducing ripples in the output current for the zero voltage-zero current switching circuit in a full-bridge DC-DC converter, is installed on the secondary side of a full-bridge DC-DC converter, its zero voltage-zero current switching operation can be performed as follows.

Switches, configured as a full-bridge circuit, on the leading leg and on the lagging leg, turn ON or OFF alternately, depending on the phase of the switch-control voltage applied to the gates of the switches. The principle of the zero voltage switching operation of the switches of the leading leg is the same as that of a conventional converter. That is, the switching loss at turn-off diminishes due to the snubber capacitor connected across the switch. However, when the switch turns ON, voltage charged in the snubber capacitor decrease to zero because they supply the load current by cut off of the other switch of the same leg. Therefore, the voltage across the switch becomes zero and the diode reverse connected to the switch in parallel turns on. Accordingly, there is no switching loss at turn-on if the switch turns on just after the diode is conducting. The zero current switching operation of the switches of the lagging leg is performed differently. The first passive capacitive element on the closed loop is charged during the powering mode in which output current is supplied from the input AC line to the load and maintains a positive voltage to the secondary side a short while by discharging its charged voltage through the second rectifying element after a freewheeling mode in which input current is not delivered to the load begins. The voltage applied to the secondary side is in turn applied through the transformer to the primary side in the reverse direction of the leakage inductor current of the primary side, causing the current of the primary side to reduce rapidly to zero, and eventually the corresponding switch on the lagging leg to turn OFF at zero current.

If the second passive capacitive element offers a path for the ripple currents induced in the second winding of the smoothing inductor, the ripple currents are divided into primary and secondary windings of the smoothing inductor in inverse proportion to its own leakage inductance. If the winding is done so that the leakage inductance of the secondary side is less than that of the primary side, the ripple currents primarily flow through the winding of the secondary side; accordingly, there are few ripple currents flowing through the output smoothing inductor.

It is to be understood that both the foregoing general description and the following detailed description are provided for exemplary and explanatory purpose only, and are intended to provide further explanation of the invention as claimed.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings:

FIG. 2A, B, C and D show a full-bridge DC-DC converter where a variety of embodiments of the circuit for the zero voltage-zero current switching circuit of the full-bridge DC-DC converter according to the present invention is set up, in which FIGS. 2A, 2B, and 2C show various modifications of the circuit according to the present invention.

FIG. 3A and B show an embodiment to limit the peak value of current to be charged into the circuit for zero voltage-zero current switching according to the present invention, in which FIG. 3A shows a circuit in which an inductor is added to the circuit in FIG. 1A.

FIG. 8A and B show waveforms of currents and voltages in the zero voltage-zero current switching operation, in which FIG. 8A is in the case of zero voltage switching.

DETAILED DESCRIPTION OF THE PREFERRED EMBODIMENTS

The configuration and operation of the preferred embodiment of the present invention will now be explained in detail, with reference to the accompanying drawings.

Figure 1A:
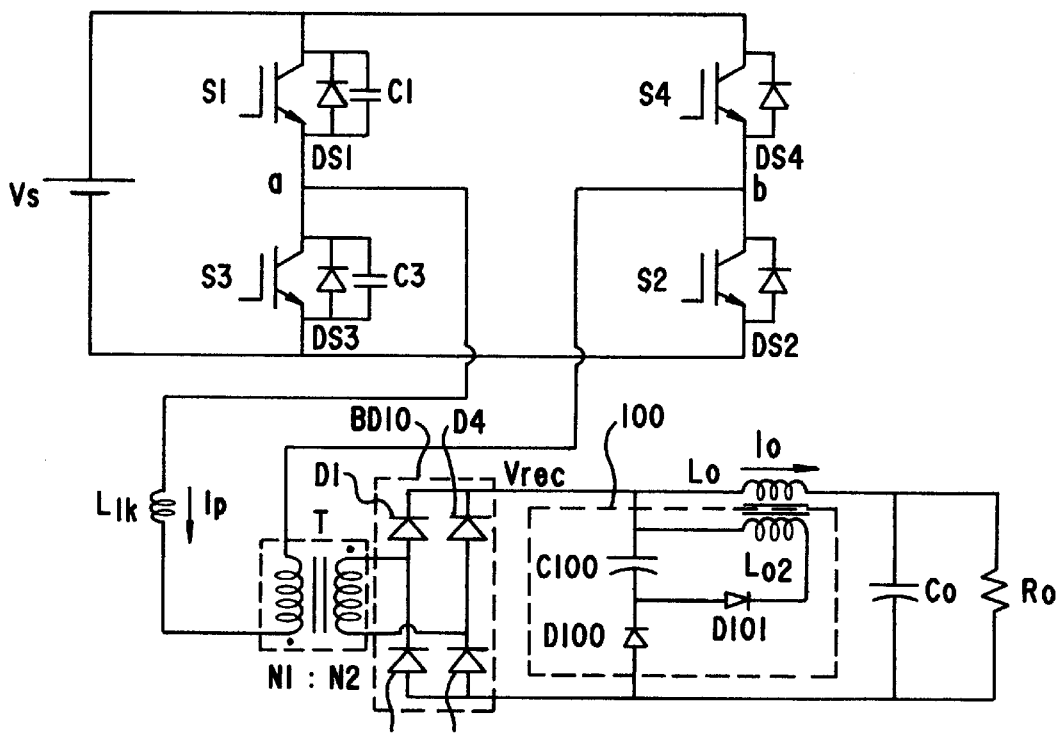
FIG. 1A and B show a full-bridge DC-DC converter where one embodiment of a circuit for zero voltage-zero current switching according to the present invention is set up, in which 1A shows a converter having a circuit only for zero voltage-zero current switching, and 1B shows a converter having a circuit that is also capable of reducing ripples in the output current.

FIG. 1A shows a full-bridge DC-DC converter, including the circuit for zero voltage-zero current switching according to the present invention. As can be seen in FIG. 1A, the full-bridge DC-DC converter is comprised of a transformer T for inducing the current and voltage from the primary side to the secondary side by the switching operation of full-bridge switches S1, S2, S3, and S4; a full-bridge rectifier BD10 by which current of the secondary side flows in only one direction; a filter (Lo and Co) on the secondary side for smoothing the output current, the load Ro, and circuit 100 of the present invention consisting of a capacitor C100 and a discharge diode D100 connected in series across the output terminals of the full-bridge rectifier BD10; and a secondary winding $L_{o2}$ of a smoothing inductor Lo and a charge diode D101 connected in series across the capacitor C100.

Figure 5:
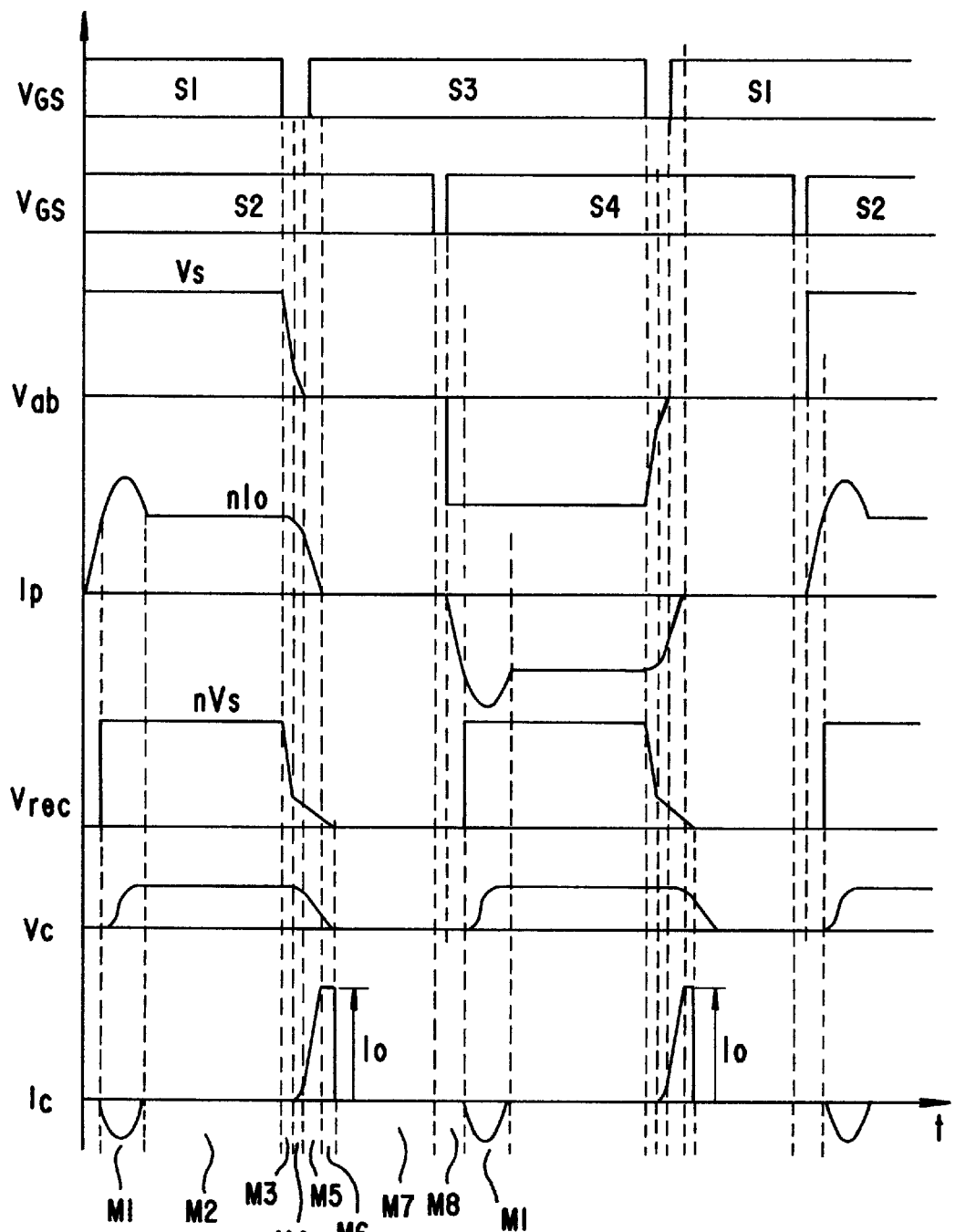
FIG. 5 shows waveforms of currents and voltages that are generated in each of the operating modes of the converter shown in FIG. 1A.
Figure 6A:
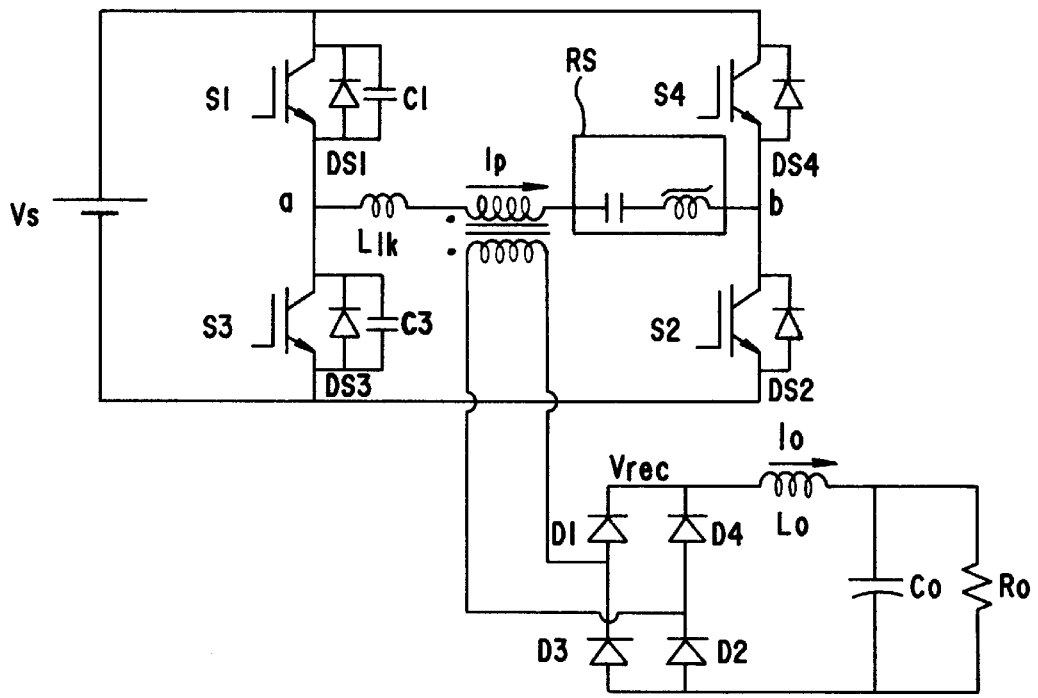
FIG. 6A, B, and C show a conventional full-bridge DC-DC converters having a zero voltage-zero current switching circuit.
Figure 6B:
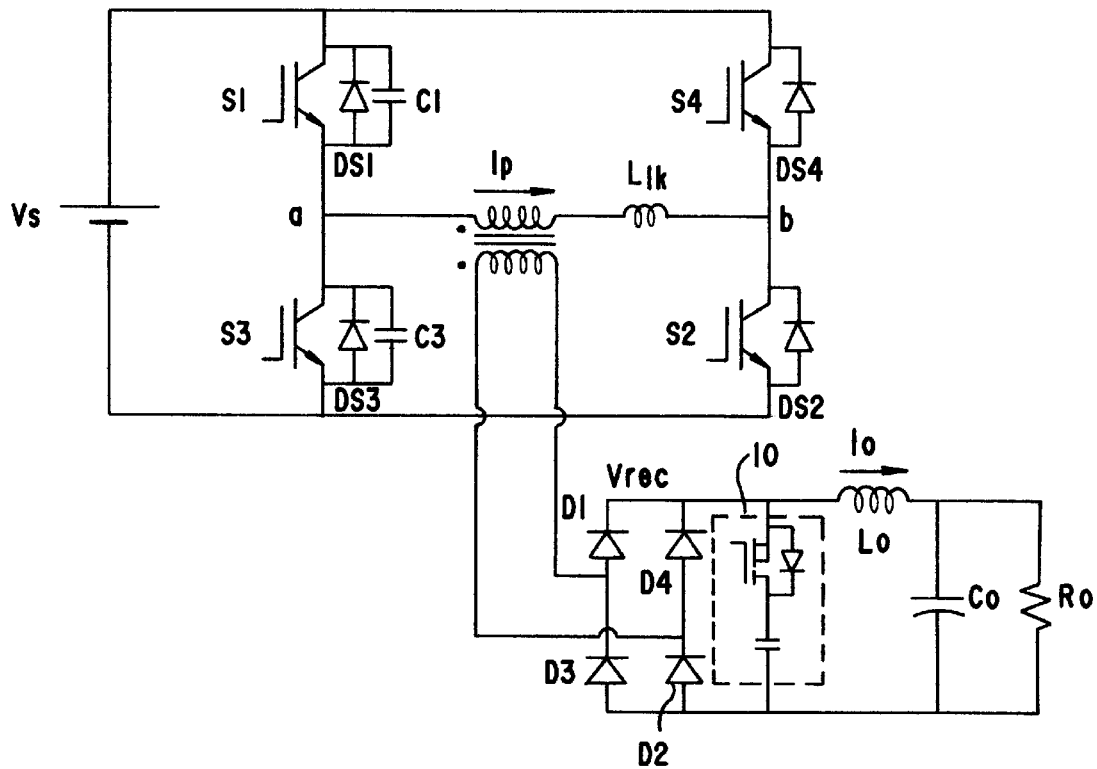
Figure 6C:
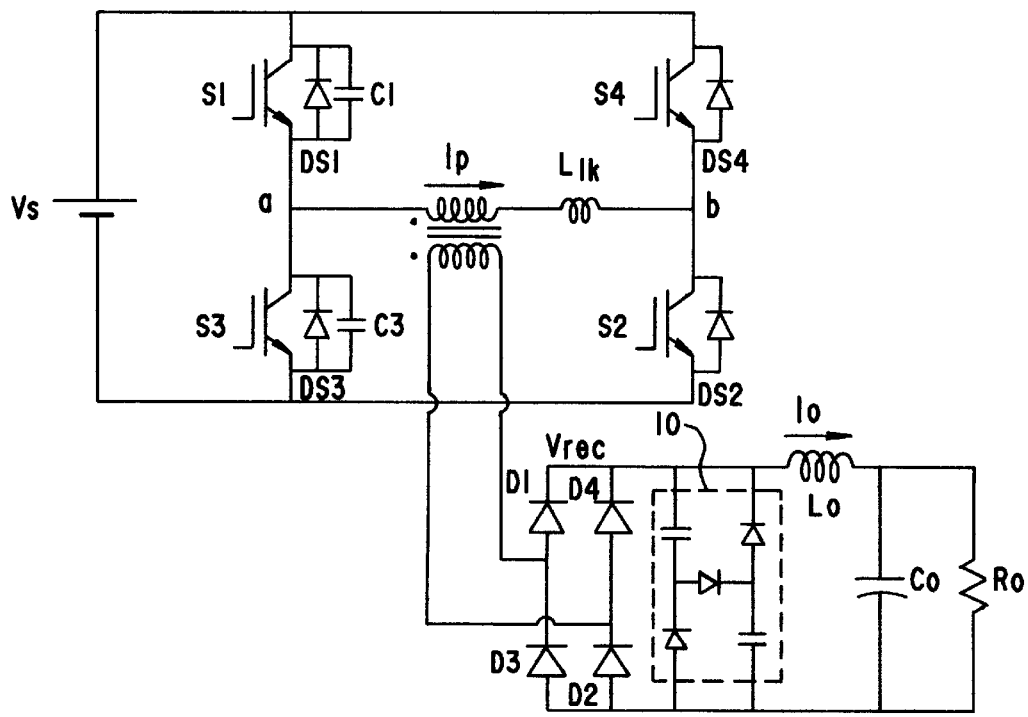
Figure 7:
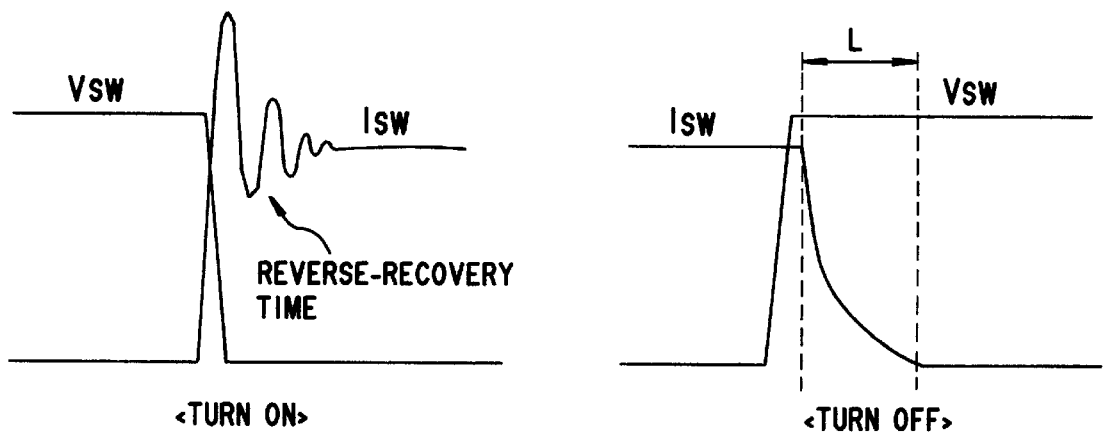
FIG. 7 shows waveforms of currents and voltages in the case of hard switching.

FIG. 5 shows a operation waveform for describing in detail the operation of the full-bridge DC-DC converter configured as above. It can be seen from FIG. 5 that the operation of the full-bridge DC-DC converter consists of several operating modes.

FIGS. 4A to 4H are equivalent circuits corresponding to each of the eight operating modes of the full-bridge DC-DC converter.

To simplify the explanation of the operation, it is assumed that inductance of the smoothing inductor Lo is large enough to make a load current Io constant during one period of the switching operation, and that the turn ratio between a primary $L_{o1}$ and a secondary winding $L_{o2}$ of the smoothing inductor Lo is set such that the ripple current of primary inductor is nearly zero.

In the following, the full-bridge DC-DC converter containing the circuit for zero voltage-zero current switching will be explained in detail, with reference to the waveforms of FIG. 5 associated with the eight operating modes.

MODE 1 (M1)

This is, called the "powering mode", the mode in which switches S1 and S2 on the primary side are turned on transferring power from the input side to the output side. The capacitor C100 starts to be charged from the zero initial state, as shown in FIG. 5, through the charge diode D101 by the voltage induced onto the secondary winding $L_{o2}$ of the smoothing inductor $L_o$. The charged voltage of the capacitor C100 is proportional to the voltage across the primary winding $L_{o1}$ of the smoothing inductor $L_o$, which is the difference in voltage between the output voltage of the full-bridge rectifier BD10 and the output voltage of the DC-DC converter. On the other hand, there occurs a small overshoot of the current $I_p$ on the primary side in the early stage of the charging of the capacitor because an additional current $nI_c$, besides the current associated with the constant output current Io, flows on the primary side associated with the current $I_c$ to charge the capacitor C100.

MODE 2 (M2)

Because the charged voltage of the capacitor C100 is lower than the output voltage of the full-bridge rectifier BD10 on the secondary side, the discharge diode D100 is reverse biased and thus is not triggered into conduction. Accordingly, there is no path through which energy stored in the capacitor C100 discharges. The capacitor C100 holds onto the charged voltage until a discharge path develops on the end of the powering mode.

MODE 3 (M3)

Figure 8A:
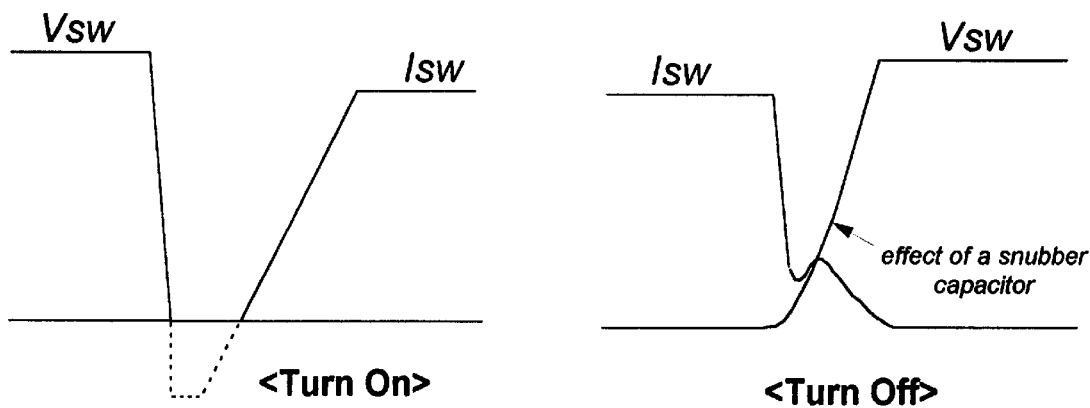
Figure 8B:
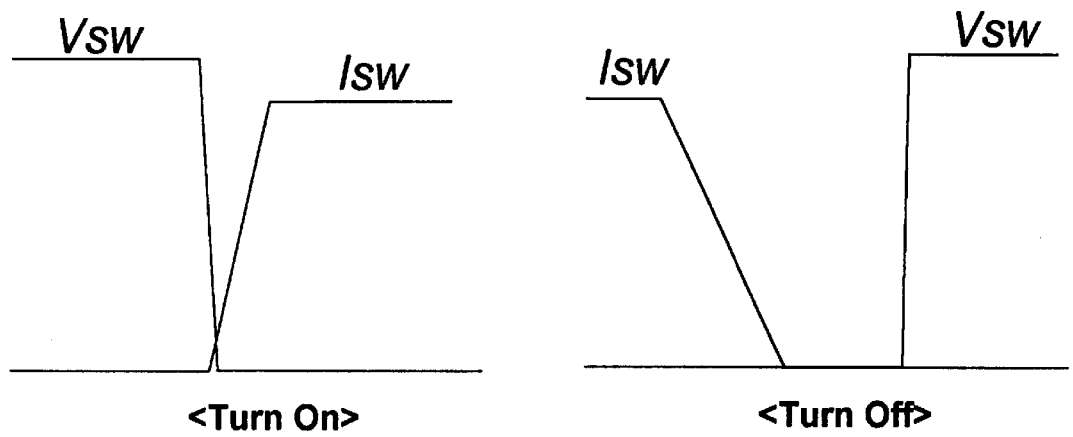
FIG. 8B is in the case of zero current switching.

When the switch S1 is opened with the predetermined duty-cycle, a snubber capacitor C1 starts to be charged by the constant load current, and a snubber capacitor C3 begins to discharge. The constantly flowing load current causes the voltage of the snubber capacitor C1 to increase linearly; thus the primary voltage $V_{ab}$ of the transformer T decreases linearly. Similar to the zero voltage switching of the conventional circuit, if the capacitance of the snubber capacitor C1 chosen is so sufficiently large that the voltage across the switch S1 is maintained at near zero during the duration of the turn-off period (see FIG. 8A), the switching loss can be reduced to near zero. For this time, the secondary voltage $V_{rec}$ decreases at the same rate as that of the primary voltage $V_{ab}$. This voltage reduction progresses until the secondary voltage $V_{rec}$ becomes equal to the voltage of the capacitor C100 charged and maintained in the M2 mode.

MODE 4 (M4)

When the secondary voltage $V_{rec}$ of the transformer T decreases to the voltage of the capacitor C100, the discharge diode D100 conducts. The voltage of the capacitor C100 thereby starts to discharge at a very slow rate through the discharge diode D100, and the secondary voltage $V_{rec}$ becomes equal to the voltage across the capacitor C100.

The voltage of the snubber capacitor C3 is discharged at a fast rate by the current through the leakage inductance of the primary side, the voltage $V_{ab}$ of the primary side becoming lower than the voltage transferred from the voltage being discharged slowly from the capacitor C100 on the secondary side. The voltage difference between the voltage transferred from the voltage $V_{rec}$ of the secondary side and the voltage $V_{ab}$ of the primary side is supplied in the reverse direction against the current $I_p$ flowing through the leakage inductance of the primary side, leading to a rapid reduction in the current $I_p$, of the primary side.

Because the current through the inductor Lo of the output filter is constant, a current, being drained from the capacitor C100 on the secondary side, is supplied to the load for supplementing the current reduction. Accordingly, the voltage of the capacitor C100 begins to decrease at a faster rate than that of the M3 step. This process continues until the voltage of the snubber capacitor C3 on the primary side is reduced to zero.

MODE 5 (M5)

If the voltage of the snubber capacitor C3 that has been discharged becomes zero, the diode DS3 reverse connected across the switch S3 conducts; the voltage across the switch S3 thereby becomes zero, enabling the zero voltage switching. In addition, if the voltage of snubber capacitor C3 becomes zero and in turn the voltage $V_{ab}$ of the primary side becomes zero, then the voltage transferred from the voltage of the capacitor C100 is supplied to the leakage inductance $L_{lk}$ on the primary side, causing the current $I_p$ through the primary side to decrease rapidly. Current supplied through the discharge diode D100 from the capacitor C100 increases as much as the current $I_p$ of the primary side decreases, causing the voltage of the capacitor C100 to decrease more rapidly. This mode proceeds until the current $I_p$ flowing through the primary side is rapidly reduced to zero by the reverse voltage that is transferred from the secondary side.

MODE 6 (M6)

Because the current $I_p$ of the primary side decreased to zero just now, a switch S2 comes to the state where it can turn OFF at zero current; at this time, the capacitor C100 on the secondary circuit supplies all the load current. Accordingly, the voltage of the capacitor C100 decreases very rapidly, and when the voltage is reduced to zero, this mode comes to an end.

MODE 7 (M7)

If the voltage of the capacitor C100 on the secondary side is discharged completely, the load current $I_o$ freewheels through the full-bridge rectifier BD10 (D2–D4 and D3–D1), and the current of the primary side is, as there is no current supply, maintained at zero. Switch S2 turns OFF with zero current at the end of this mode when the minority carriers inside switch S2 disappear completely just after current in the primary side circuit became to zero.

MODE 8 (M8)

Switch S4 turns ON after a dead time when there is no current path in the primary side. Because the current cannot change rapidly due to the leakage inductance of the primary side and there is no reverse-recovery of diode DS4, the turn-on of switch S4 is also performed at the zero current state.

The voltage $V_{rec}$ of the full-bridge rectifier BD10 on the secondary side is zero at the instant when switch S4 turns ON. Because input voltage Vs is all applied to the leakage inductance $L_{lk}$ through switches S3 and S4 on the primary side, the current $I_p$ of the primary side rapidly increases linearly, and the current induced on the secondary side is thereby supplied to the load through the full-bridge rectifier BD10. The voltage of the secondary side is held at zero until the current of the secondary side increases to the value of the load current Io.

In the one embodiment of the full-bridge DC-DC converter with the circuit for zero voltage-zero current switching, switches S1 and S3 of the leading leg perform zero voltage switching (M3: TURN-OFF, M5: TURN-ON), and switches S2 and S4 of the lagging leg perform zero current switching (M4: TURN-OFF, M8: TURN-ON) according to the operating modes described above.

Figure 1B:
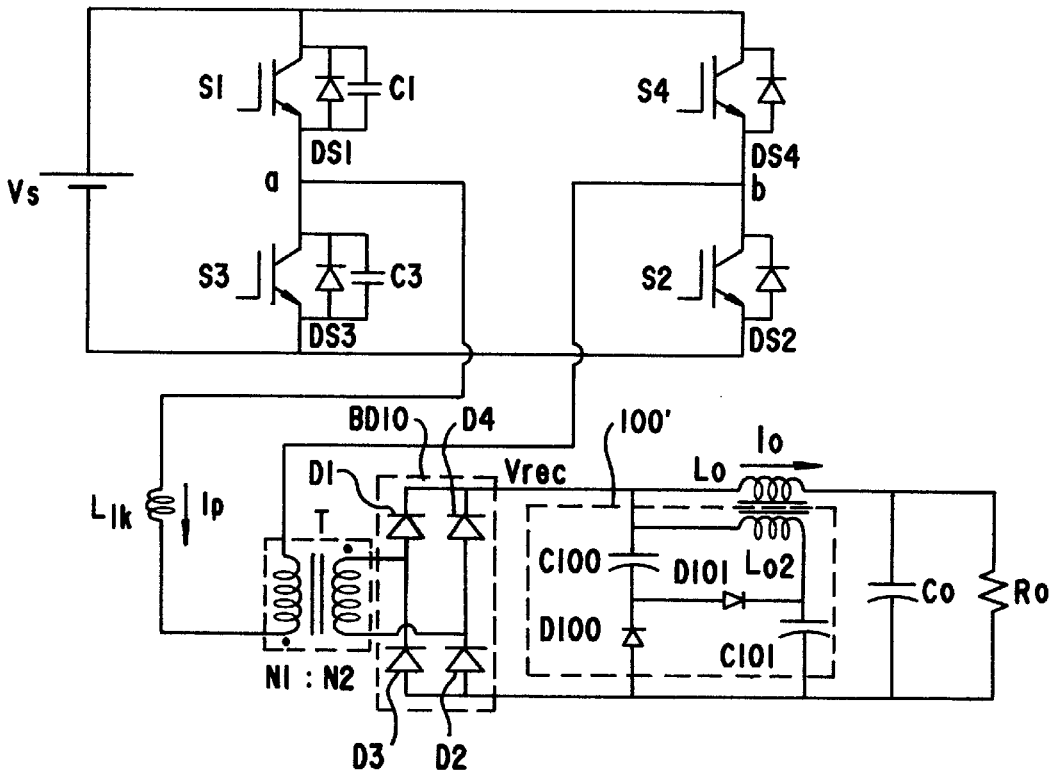

FIG. 1B shows a full-bridge DC-DC converter with a circuit with the capability of reducing ripples in the output current for zero voltage-zero current switching according to the present invention, in which a capacitor C101 is additionally connected between the output of the charge diode D101 and the ground to remove ripples in the output current. The following is a detailed description of how this embodiment can remove ripples in the output current.

Because the smoothing inductor Lo in the output filter performs the operation of a transformer only for the AC current, it influences the AC part of the output current, not the DC current. Capacitor C101 provides a path for the ripple currents of the second winding. The leakage inductance of inductor in both winding Lo is not identical. The ripple currents flowing through each winding are in inverse proportion to the leakage inductance of each winding because the voltages applied to the two leakage inductances are the same. If the windings are turned such that the leakage inductance of the second winding is much smaller than that of the first winding, a negligible amount of ripple currents will occur in the first winding. As a result, ripple currents through the first winding to the output side are effectively reduced by providing a flow of ripple currents through capacitor C101 and the proper winding of the inductor Lo.

FIG. 2 shows a full-bridge DC-DC converter with a variety of the circuit for zero voltage-zero current switching according to the present invention. The circuits shown in FIGS. 2A, 2B, and 2C show that there exist several ways to arrange a second winding $L_{o2}$ of the smoothing inductor Lo, a capacitor C100, and diodes D100 and D101 in the secondary side of a full-bridge DC-DC converter. The circuit shown in FIG. 2D shows how to reduce the number of elements in the secondary side circuit required to perform zero voltage-zero current switching, comprised of capacitor C100 and diodes D100 and D101.

Figure 2A:
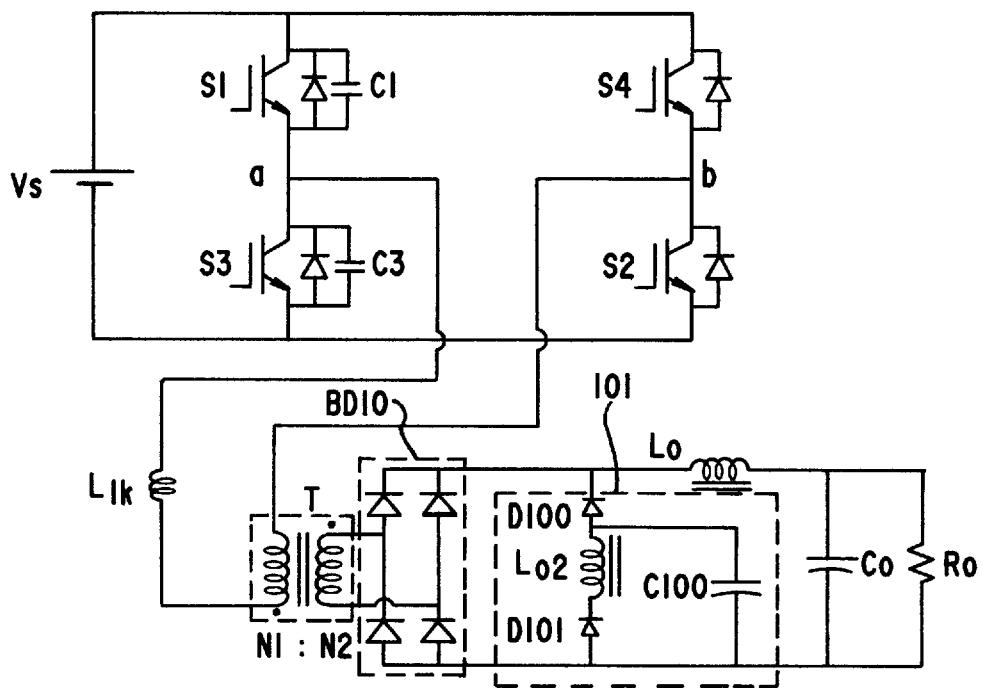
Figure 2B:
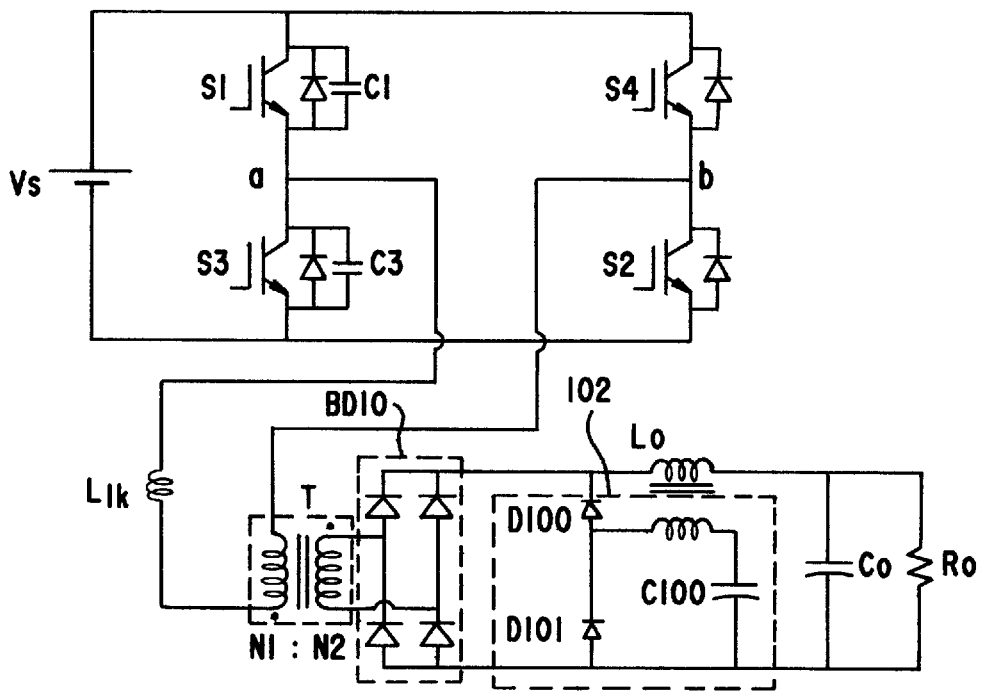
Figure 2C:
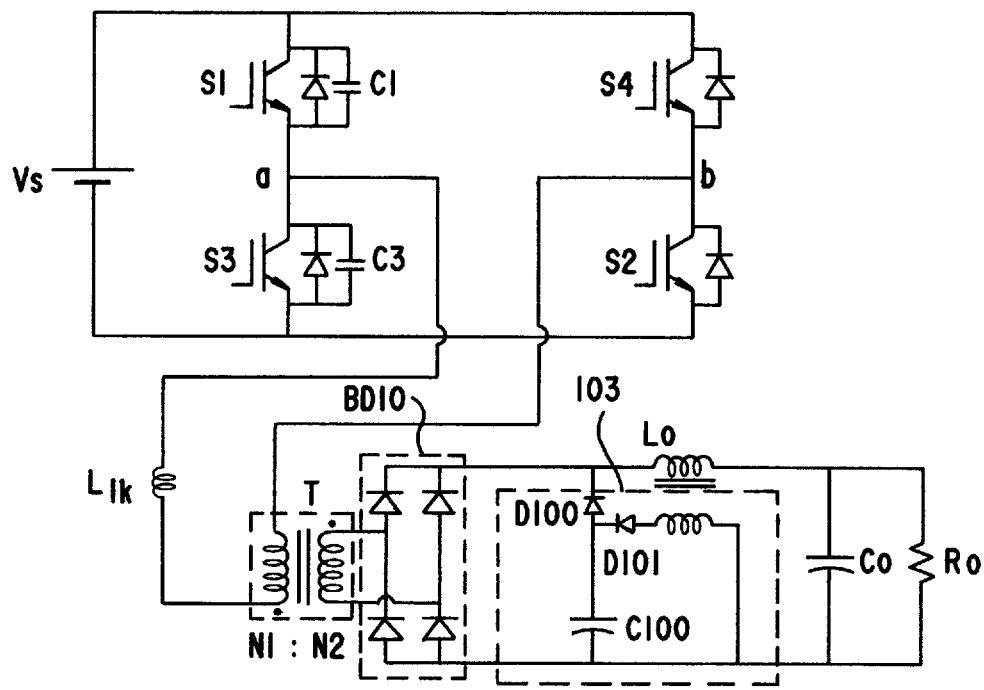
Figure 2D:
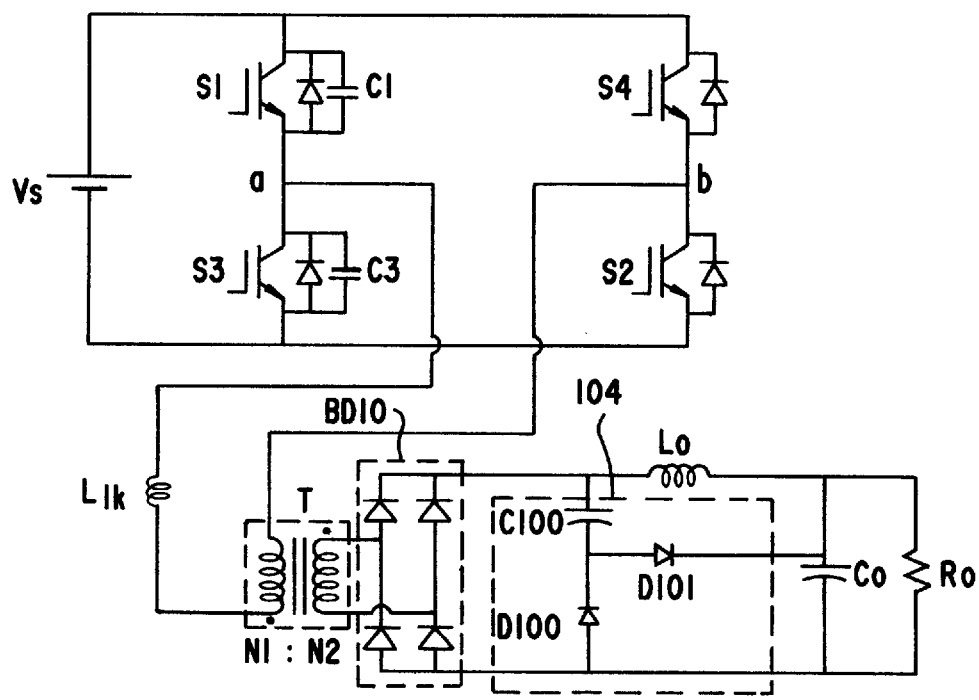
FIG. 2D shows another embodiment that does not use the second winding of the smoothing inductor of the output filter.

Four embodiments, configured as described above, differ only in that constituting elements are connected differently to each other, and their operation follows the same modes as the operation of FIG. 1A except for the circuit of FIG. 2D. For the circuit for zero voltage-zero current switching in FIG. 2D, capacitor C100 is charged not by the current induced by the smoothing inductor Lo, but by the current directly supplied from rectifier BD10 on the secondary side; the charge diode D101 connected directly to the output filter ($L_o$ and $C_o$) offers a path through which capacitor C100 charged up electrical energy.

Figure 3A:
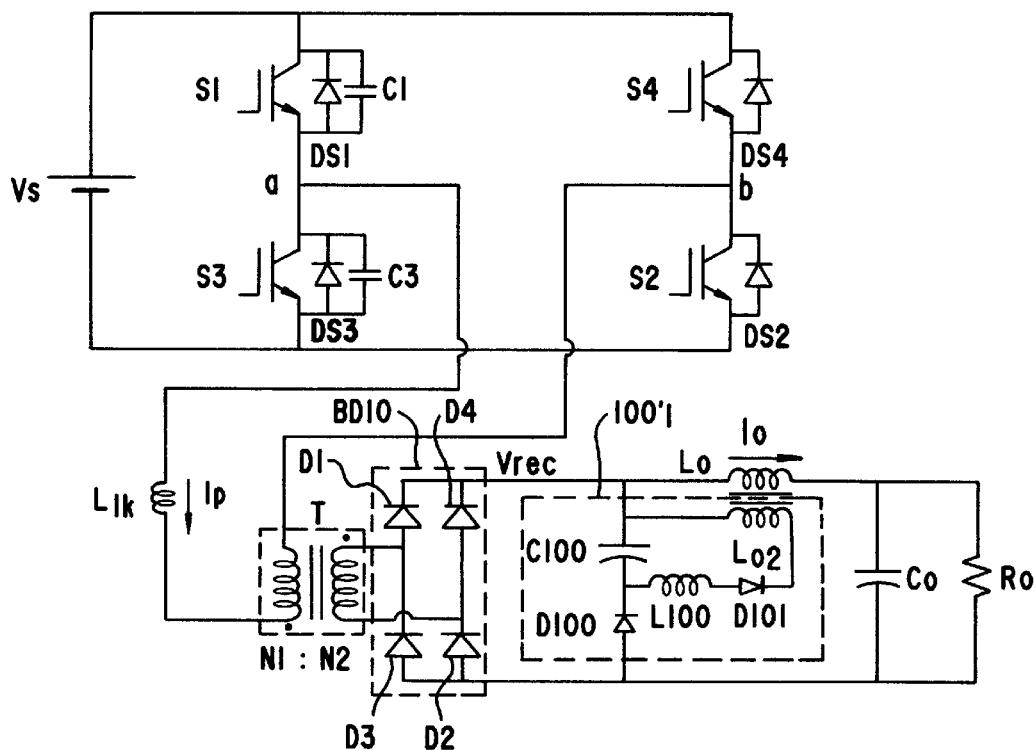
Figure 3B:
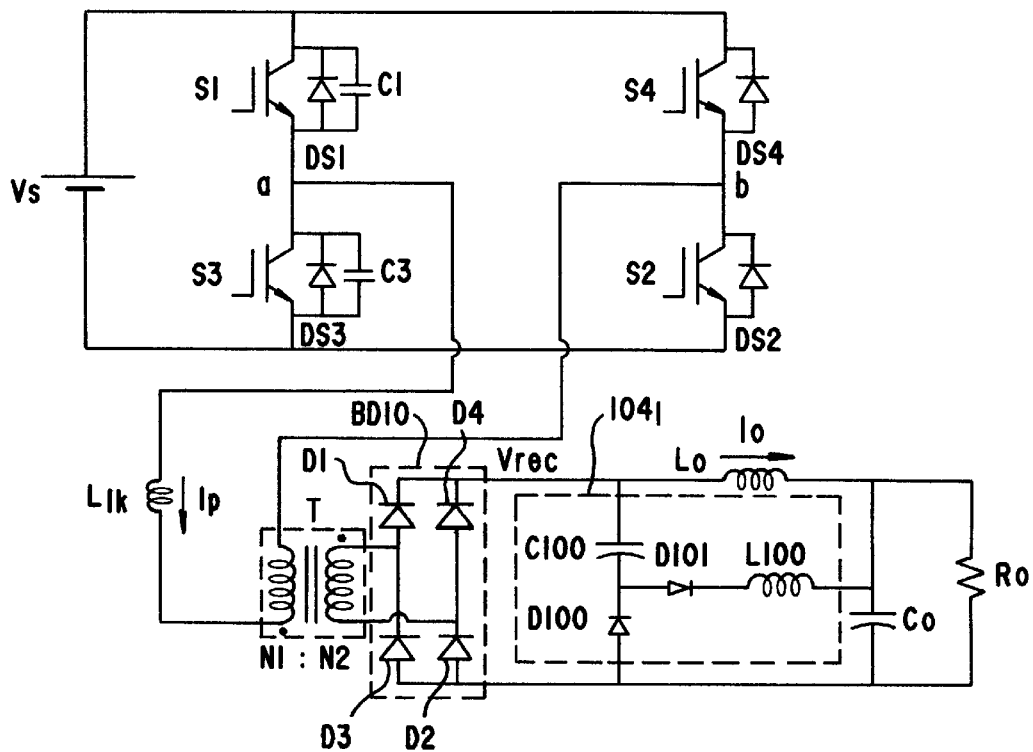
FIG. 3B shows a circuit in which an inductor is added to the circuit in FIG. 2D, FIG. 4A–H show equivalent circuits corresponding to each of the operating modes of the converter shown in FIG. 1A.
Figure 4B:
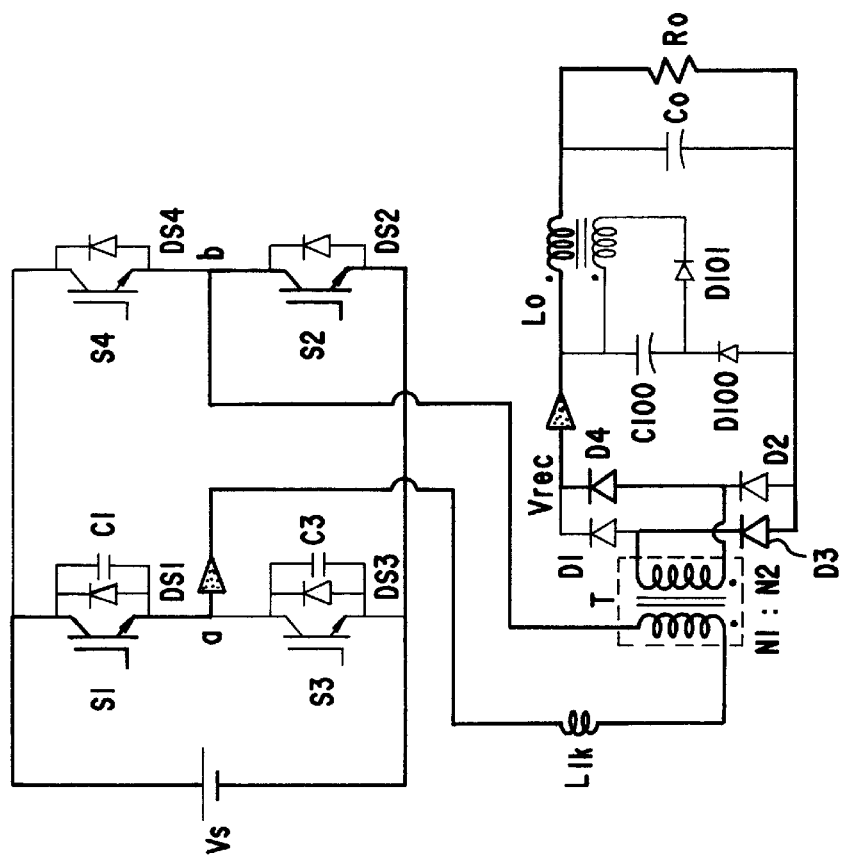
Figure 4A:
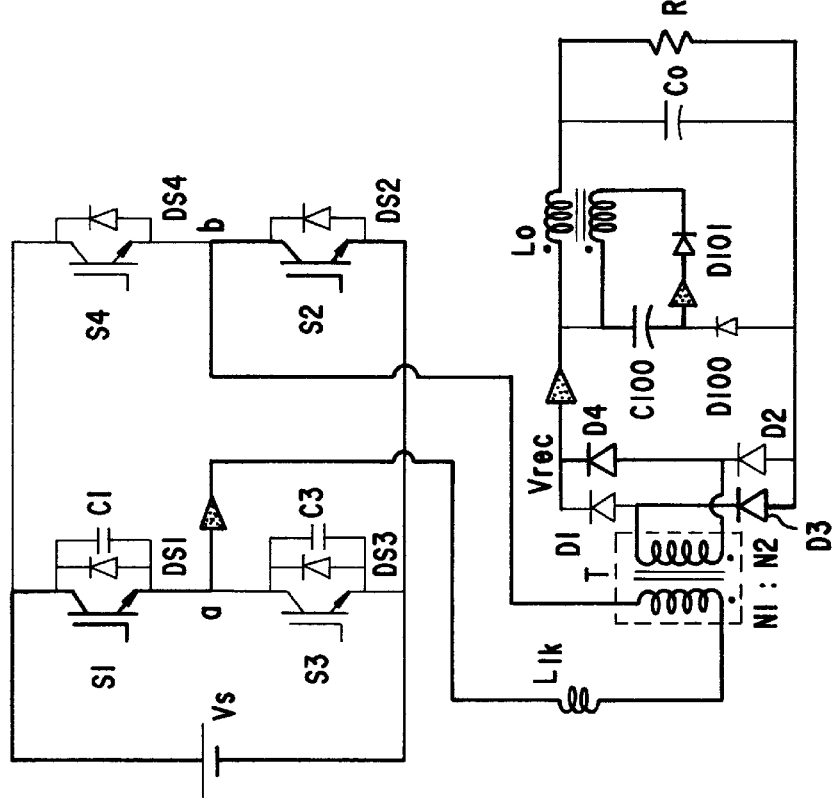
Figure 4D:
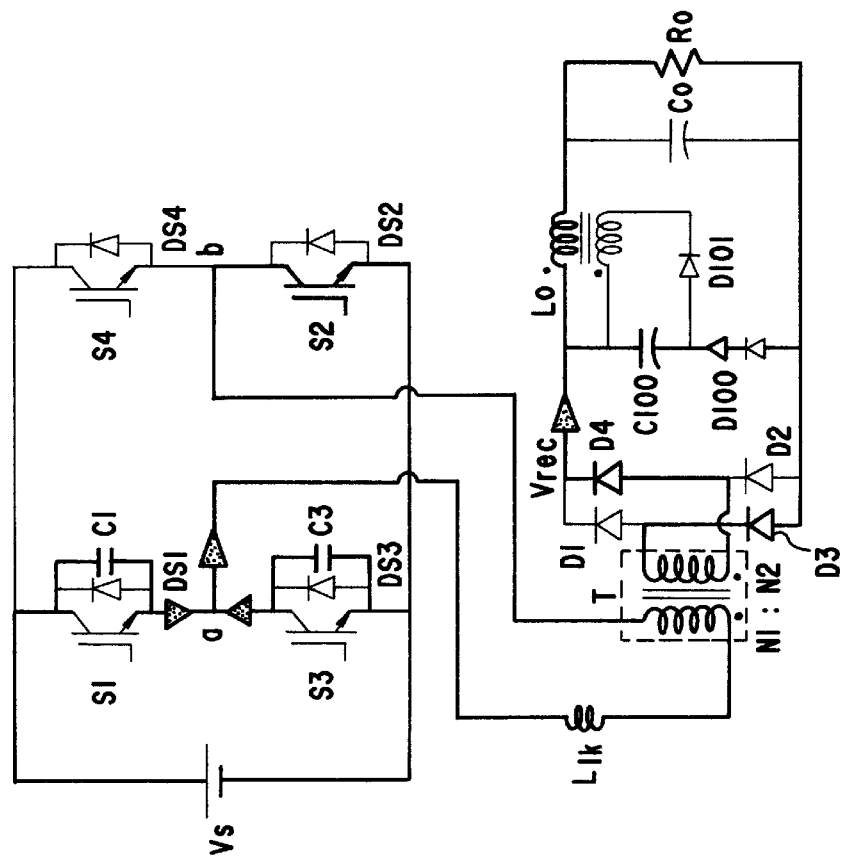
Figure 4C:
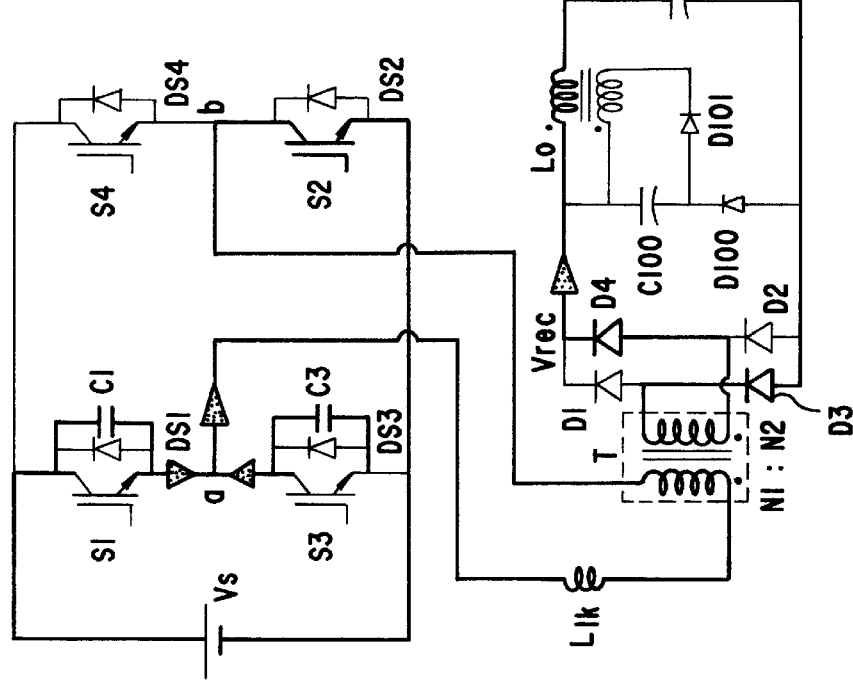
Figure 4E:
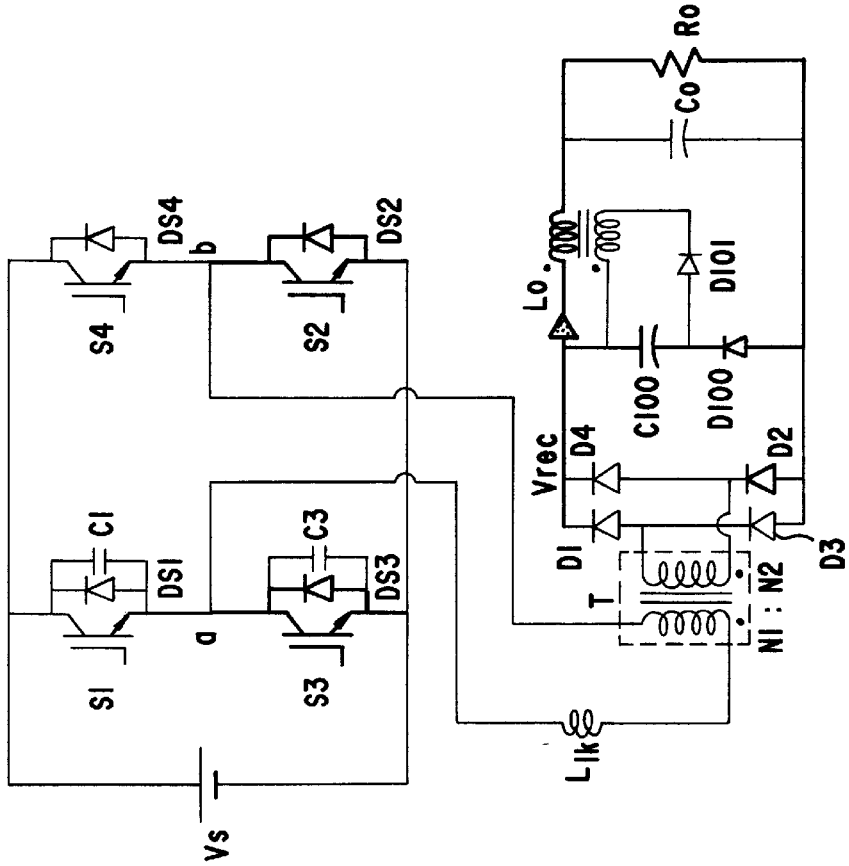
Figure 4F:
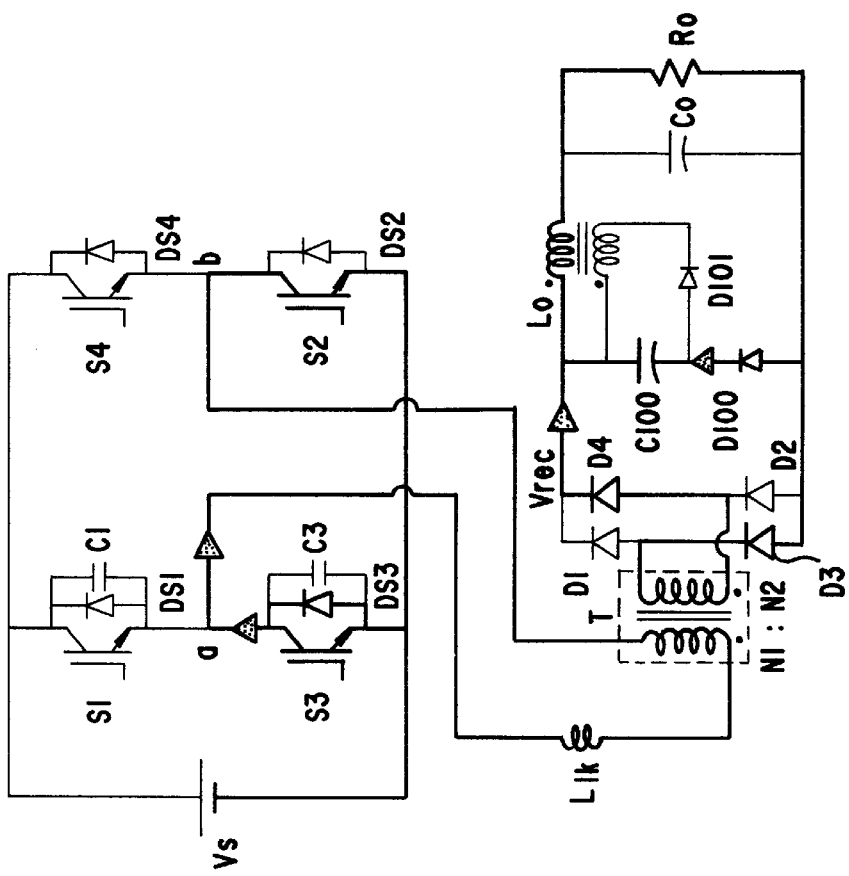
Figures 4G, 4H:
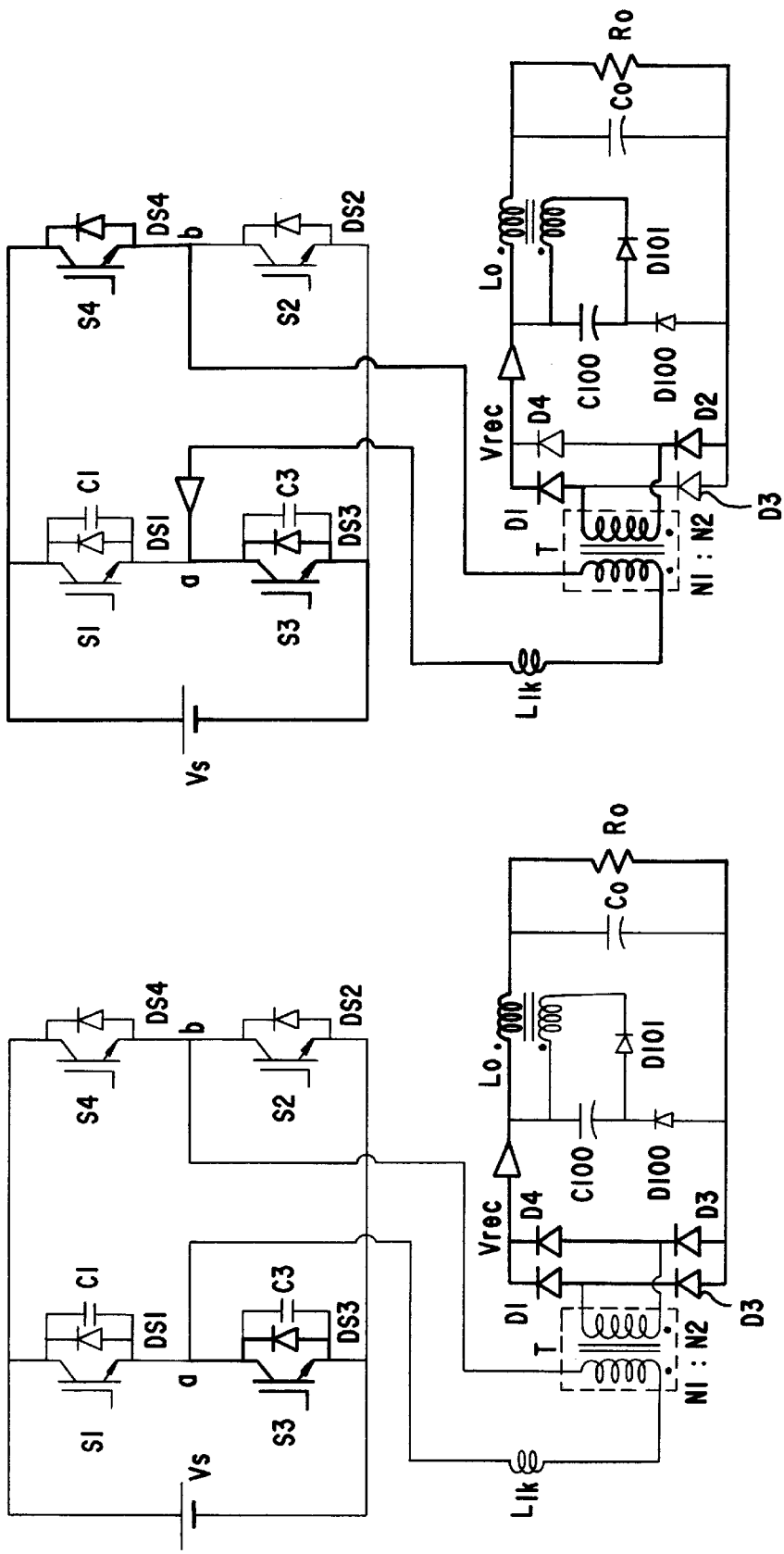

FIG. 3 shows the embodiment further comprised of coil L100 to limit the peak value of the current charged into capacitor C100 in the circuit of the present invention. FIG. 3A shows the circuit in which coil L100 is appended to the circuit of FIG. 1B and FIG. 3B shows the circuit in which coil L100 is appended to the circuit of FIG. 2D. Coil L100 limits the peak value of the current charging the capacitor C100 during the M1 step, i.e., the powering mode, ensuring that diode BD10 is not voltage-stressed. Regardless of its location on the secondary side, coil L100 performs the same function only if it is located on the path which capacitor C100 is charged through but a discharging current from capacitor C100 does not flow through. In other words, for the circuit of FIG. 3A, coil L100 can be inserted into any location on the branch consisting of charge diode D101 and the second winding $L_{o2}$ of the smoothing inductor Lo; for the circuit of FIG. 3B, coil L100 has only to be connected in serial with charge diode D101.

The present invention uses this arrangement to perform a switching operation at zero voltage and zero current, as well as to achieve a reduction of ripples in the current flowing through he inductor Lo. A cost reduction is also realized, because no active elements or dissipative elements such as saturation reactor are required.

For the circuit with a capability of reducing ripples in the output current for zero voltage-zero current switching in a full-bridge DC-DC converter configured as described above, because it does not include expensive elements such as active elements or dissipative elements such as saturation reactors and it has very simple structure, the circuit for zero voltage-zero current switching in a full-bridge DC-DC converter can be embodied at lower costs. In addition, ripples in the current through the inductor of the output filter can be remarkably reduced simply by adding a capacitor. The circuit is particularly well suited for a DC-DC converter requiring high-frequency switching due to its simple handling for high-power capacity.

For the full-bridge DC-DC converter, including a circuit with the capability of reducing ripples in the output current for zero voltage-zero current switching, rectifying diodes having a low voltage rating can be used because no high voltage peaks across the rectifier on the secondary side circuit occur. Hence, the circuit is very useful as well as economical.

The foregoing is provided only for the purposes of illustration and explanation of the preferred embodiment of the present invention. Changes, variations, and modifications may be made by those skilled in the art without departing from the sprit and scope of the invention.

What is claimed is:

1. A circuit for zero voltage-zero current switching in a full-bridge DC-DC converter having a smoothing inductor on the output side, comprising:

a secondary winding of said smoothing inductor;

a first passive capacitive element and a first rectifying element that are connected to said secondary winding to form a closed loop having three connecting points; and a second rectifying element connected between any connecting point on said closed loop and an output terminal of a rectifier on the secondary side of the converter, wherein:

said second rectifying element directs a current to flow toward a positive terminal of said rectifier; one of the other two connecting points on said closed loop is connected to the other output terminal of said rectifier; and three elements in said closed loop are arranged in such a way that a current induced to said secondary winding by the current flowing through said smoothing inductor charges said first passive capacitive element wherein its side facing said positive terminal of said rectifier becomes positive while said first rectifying element is not located in a path through which said first passive capacitive element discharges.

2. A circuit according to claim 1, further comprising a second passive capacitive element, wherein: said any connecting point is a connecting point between said first rectifying element and said first passive capacitive element; said output terminal of said rectifier is one through which the current flows into said rectifier; said one of the other two connecting points is a connecting point between said second winding and said first passive capacitive element; and said second passive capacitive element is connected between the remaining one of said connecting points and the ground.

3. A circuit according to claim 2, further comprising a passive inductive element that is connected in serial with any one of the elements in said closed loop, and that is not located in a path through which said first passive capacitive element discharges.

4. A circuit according to claim 1, further comprising a passive inductive element that is connected in serial with any one of the elements in said closed loop, and that is not located in a path through which said first passive capacitive element discharges.

5. A circuit for zero voltage-zero current switching in a full-bridge DC-DC converter with both a smoothing inductor and a smoothing capacitor on the output side, comprising:

a passive capacitive element; and first and second rectifying elements, wherein:

said passive capacitive element and said first and second rectifying elements are configured such that they form a Y-type connection with one another; said passive capacitive element is connected to a positive terminal of a rectifier on the secondary side of the converter; said first rectifying element is connected with said smoothing capacitor, directing a current charging said passive capacitive element to flow into a load; and said second rectifying element is connected to the ground to direct a discharging current from said passive capacitive element to flow through said smoothing inductor.

6. A circuit according to claim 5, further comprising a passive inductive element that is connected in serial with said first rectifying element.

* * * * *